United States Patent
Bryant (12)

(10) Patent No.: US 6,462,772 B1
(45) Date of Patent: Oct. 8, 2002

(54) METHOD OF CALIBRATING IMAGE SCANNING APPARATUS OF A PHOTOGRAPHIC FILM SCANNER

(75) Inventor: Steven M. Bryant, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/219,032

(22) Filed: Dec. 23, 1998

(51) Int. Cl.[7] .............................................. H04N 5/253
(52) U.S. Cl. ......................... 348/96; 358/461; 356/404
(58) Field of Search ........................... 348/96; 358/461; 250/548; 356/404

(56) References Cited

U.S. PATENT DOCUMENTS

| 3,885,866 A | 5/1975 | Stearns ........................ 358/461 |
| 4,097,892 A | * 6/1978 | Balding ....................... 358/527 |
| 4,508,686 A | 4/1985 | Shaber et al. ................ 250/548 |
| 4,666,307 A | 5/1987 | Matsumoto et al. ......... 356/404 |
| 4,974,068 A | 11/1990 | Hiramatsu et al. .......... 358/506 |
| 5,248,887 A | 9/1993 | Oberhardt ................... 250/548 |
| 5,267,053 A | 11/1993 | Potucek et al. ............. 358/446 |
| 5,382,508 A | 1/1995 | Ikenoue ...................... 430/496 |
| 5,406,070 A | 4/1995 | Edgar et al. ............. 250/208.1 |
| 5,563,723 A | * 10/1996 | Beaulieu et al. ............ 358/461 |

* cited by examiner

Primary Examiner—Chris Kelley
Assistant Examiner—Allen Wong
(74) Attorney, Agent, or Firm—Francis H. Boos, Jr.; Roland R. Schindler, II

(57) ABSTRACT

In a photographic film digital image scanner, long term adverse effects on image scanning system response are compensated for by establishing an initial gain calibration profile in advance of commencing image scanning operation. A reference Dmin value is established at the same time, preferably from film Dmin regions associated with the bar code pattern located in the leader portion of the film. When image scanning operation is commenced, an updated Dmin value is established for the frame being scanned and the initial gain calibration profile is adjusted by multiplying the pixel-by-pixel values in the profile by the ratio of the reference Dmin over the up-dated frame-specific Dmin value. Preferably, the same image sensor photosites used to establish the reference Dmin value are used for establishing the frame-specific Dmin value and the readings are taken from Dmin regions of the film associated the bar code pattern adjacent the frame to be scanned.

11 Claims, 4 Drawing Sheets

METHOD OF CALIBRATING IMAGE SCANNING APPARATUS OF A PHOTOGRAPHIC FILM SCANNER

FIELD OF THE INVENTION

The present invention relates generally to the field of photographic film image scanners and more specifically to calibrating image scanning apparatus in such scanners.

BACKGROUND OF THE INVENTION

Photographic film scanners for converting optical images on a film strip into files of digital data on a pixel-by-pixel basis commonly employ a solid state image sensor having an array of pixel sized photosites. Before scanning individual image frames on the film strip, it is necessary to perform a calibration procedure in which signal outputs from individual photosites are adjusted to eliminate effects in the scan system that adversely affect the accuracy of the signal outputs in representing pixel density values of the scanned image. A typical solid state photosensor of this type is a charge coupled device (CCD) imager containing an array of light detecting photosites which accumulate charge depending on the light energy projected onto them. After some charge accumulation time, the charges in the photosites are transferred to a charge shifting structure so that the charges may be shifted out of the CCD and measured by a signal processing circuit in order to form an image signal representative of the image projected onto the CCD. Because of such things as manufacturing variability in the CCD, dust or contaminants in the optical path which projects an image onto the CCD, light source non-uniformity, or other source of variations, the system response for individual photosites may not be the same from pixel-to-pixel of the image. Compensation for this pixel to pixel variation may be provided in the charge measuring process. It is known that this compensation can be provided by multiplying the output value for each photosite by compensating gain and offset values. Offset compensation is used to adjust for different photosite dark current (no illuminating light) characteristics. Gain compensation is used to adjust for different photosite sensitivities as well as to eliminate perturbations in the sensor output caused by anomalies in the optical scanning path, such as dust particles on the film strip and the like.

Typically, the system response for a given imaging pixel does not change in the short-term. Hence, the gain and offset values required to adjust the system response for given imaging pixels back to some ideal response can be determined by a calibration process and then applied whenever the signal for the imaging pixel he shifted out of the CCD. A typical calibration process obtains samples of the system response for each imaging pixel at some nominal signal input level with some nominal gain an offset values and then calculates the required gain and offset values for each of the imaging pixels.

In a photographic film scanner, it is common practice to perform a calibration of the image scanner at the beginning of scanning of images on a strip of photographic film. This calibration setup, referred to herein as gain and offset calibration profiles, is then used in the scanning of successive images on the film strip. However, when a long film strip with as many as 40 images on the film strip, the time to complete scanning of all of the images on the film strip can take several hours. During this time, significant changes in operating conditions of the scanner can cause the initial scan calibration to in accurately reflect necessary compensation to achieve proper output signal. The system can drift due to thermal variations, such as gradual heating up of the scanner components after initial power-up and due to changes in ambient conditions, for example, sunshine on the scanner. There is therefore a need for a calibration arrangement for a photographic film scanner which can adjust the calibration settings for scanning operations that will compensate for changes in system conditions throughout the scanning operation.

SUMMARY OF THE INVENTION

In accordance with the invention, there is provided a method of scanning a film strip and establishing image frame-specific gain calibration settings for a film image scanner including a solid state image sensor including an array of photosites wherein the method comprises obtaining and setting, in advance of commencing image scanning operation, an initial gain calibration profile for gain adjustment, on a photosite-by-photosite basis, of output signals from said array of photosites and obtaining, at substantially the same time as said initial gain calibration profile is set, a reference film Dmin value from at least one predetermined photosite aligned with a region of film pixels extending longitudinally of the film strip outside of image frame areas of the film. The method includes subsequently advancing the film strip to one or more image frames to be scanned; obtaining, for each frame to be scanned, a frame-specific Dmin value from said at least one photosite obtained from said region adjacent to each said image frame to be scanned and then setting a revised gain calibration profile for each image frame scan based on adjustment of said initial gain calibration profile in proportion to differences between said reference Dmin value and said frame-specific Dmin value corresponding to the image frame to be scanned.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
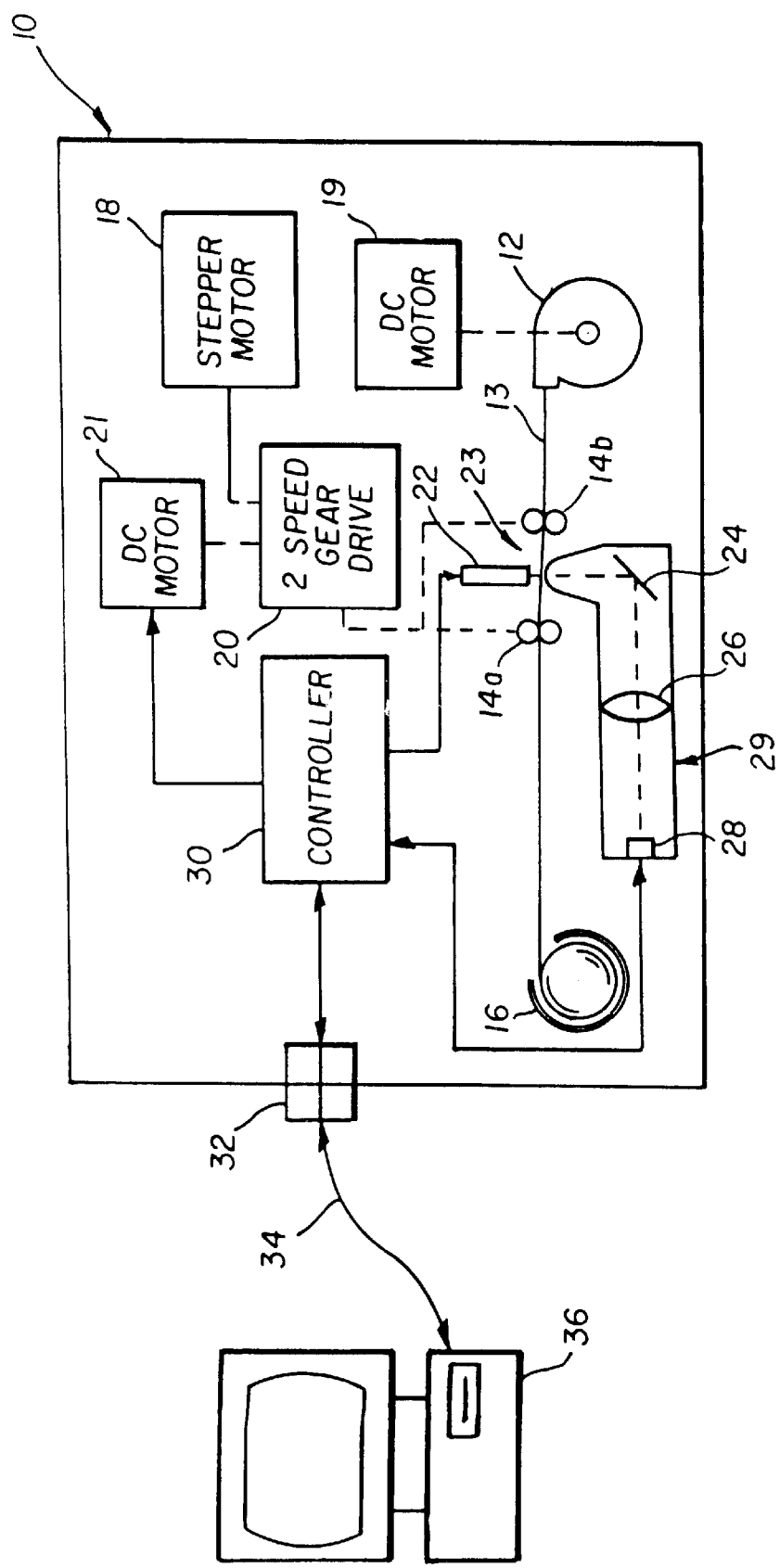
FIG. 1 is schematic illustration of a photographic film scanner with which the method of the present invention may be employed.

In FIG. 1, there is shown a film scanner 10 in which a processed film strip 13 extends from film supply cartridge 12 through a film transport mechanism, comprising a pair of nip rollers 14a, 14b driven by a stepper motor 18, to a film takeup chamber 16. The stepper motor is coupled to the nip rollers by way of a two-speed gear drive mechanism 20. A DC motor 21 is connected to the gear drive mechanism to perform shifting between high and low speed operations. The high speed operation is used for advancing the film in a forward direction between image frames and in the reverse direction during film rewind. The low speed operation is used in the forward direction during scanning of an image frame on the film. The scan line resolution for a particular image scan operation is selected by controlling the step rate of the stepper motor 18. A DC motor 19 couples with the spool of the film supply cartridge to initially thrust the film strip from the cartridge to the nip rollers and later to drive the cartridge spool in the reverse direction in the course of rewinding the film back into the cartridge.

The space between the nip rollers 14a, 14b comprises a film scan imaging gate 23. This scan gate accommodates an imaging channel which includes an illuminant head 22 and an imaging assembly 29. In a preferred embodiment of the invention, the illuminant head 22 comprises a linear array of interleaved, spectrally separated LED light sources emitting light respectively in the red, blue and green spectra for transmission through the film image frame in the scan gate. By separately controlling the ON times of the red, blue and green LEDs the proper amount of light for each color is sent through the film to achieve a balanced color image from the film. The imaging assembly 29 comprises a mirror 24, a focussing lens 26 and a linear light sensor 28 for imaging the light transmitted through the film onto the linear light sensor. In the preferred embodiment being described herein, the light sensor 28 is preferably a trilinear CCD sensor of known construction having suitable red, blue and green filters to render the individual linear sensors separately responsive to the LED red, blue and green spectral illuminants from the illuminant assembly.

A programmed controller 30 is provided to control the overall operation of the scanner. This includes connections to each of the motors to control the motor functions described above. In addition, the controller 30 is coupled to illuminant head 22, CCD sensor 28 and, via host interface 32 and cable 34, to a host computer 36 and operates to control the timing and processing of data output from the CCD sensor 28, the timing of data transfer to the host computer and the ON/OFF timing of the LED light sources in illuminant head 22.

Figure 2:
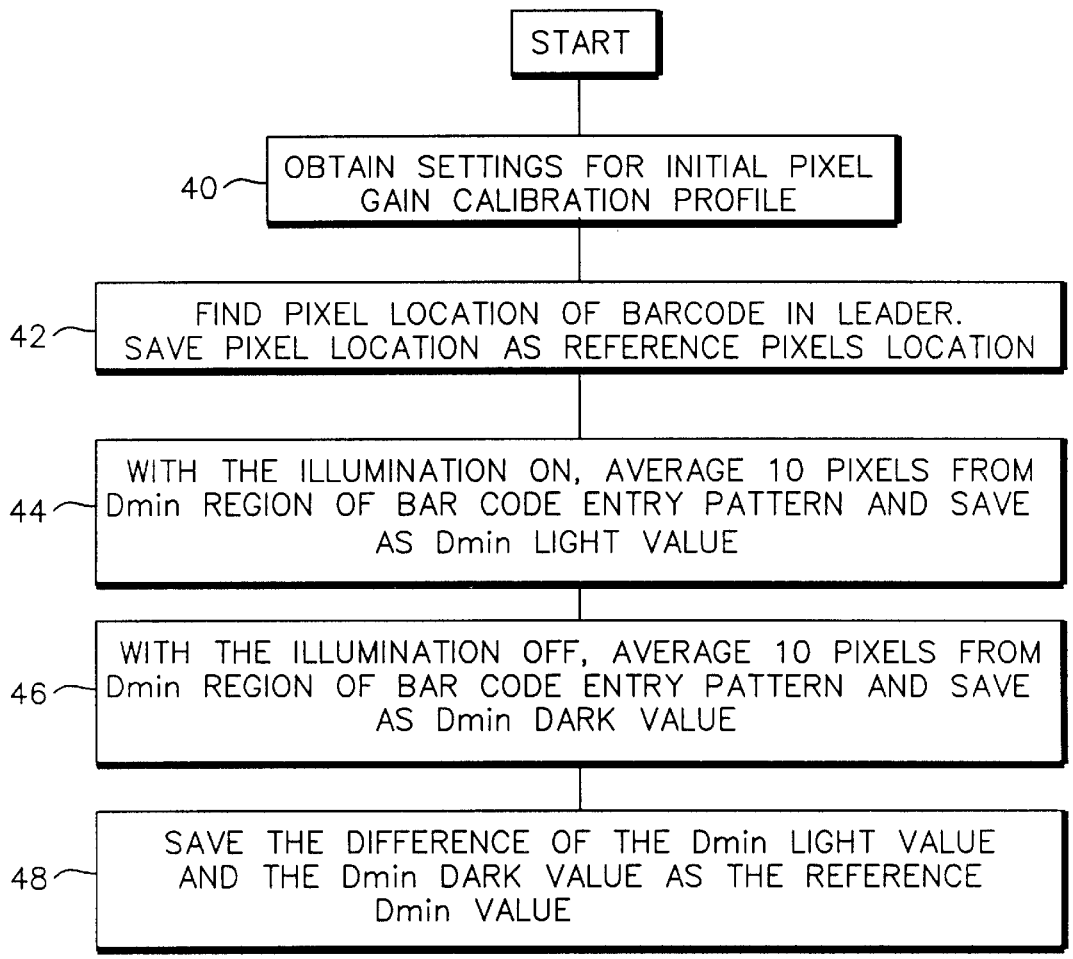
FIG. 2 is a flow diagram illustrating the initial calibration portion of the method of the present invention.
Figure 3:
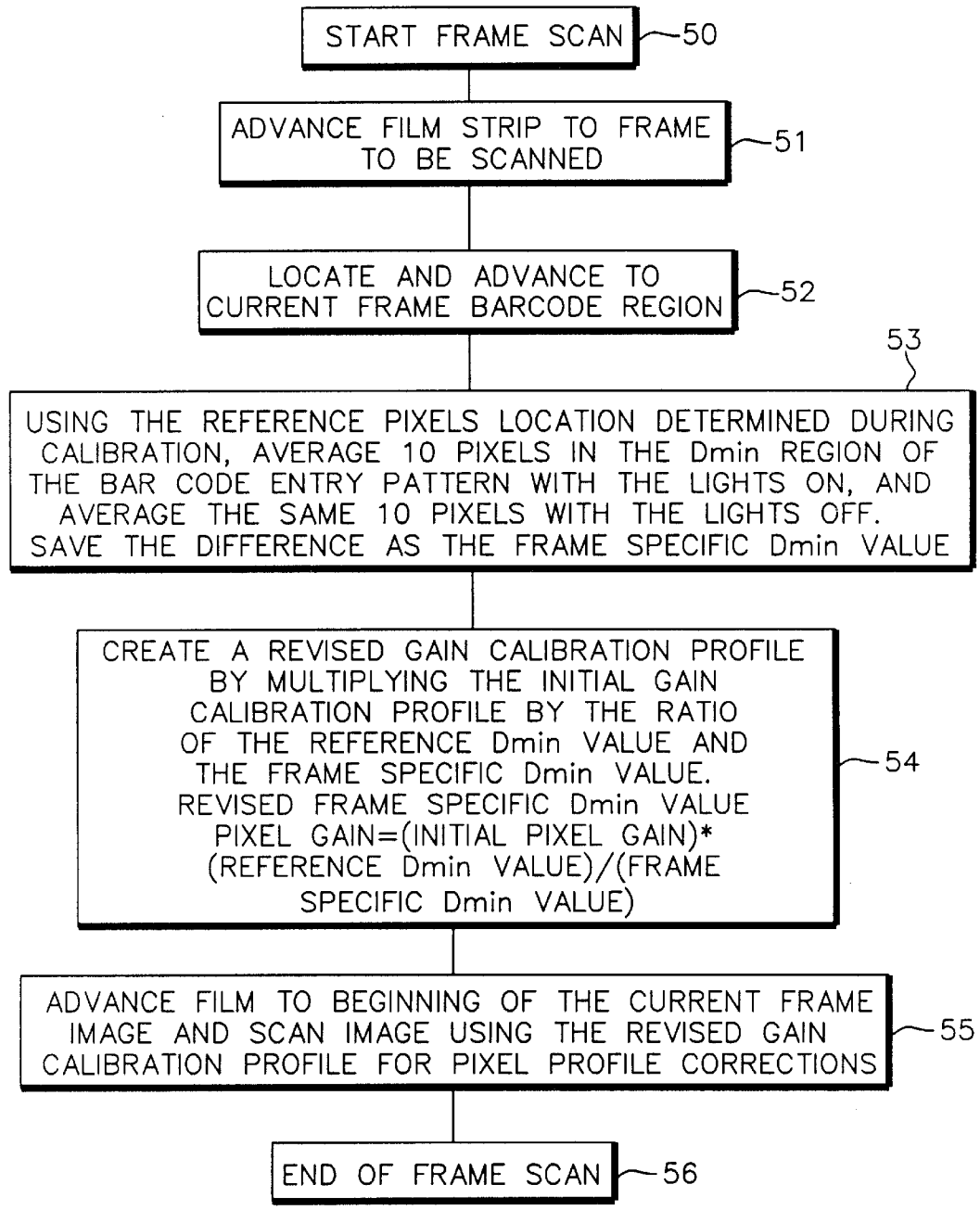
FIG. 3 is a flow diagram illustrating the frame scan portion of the method of the invention.
Figure 4:
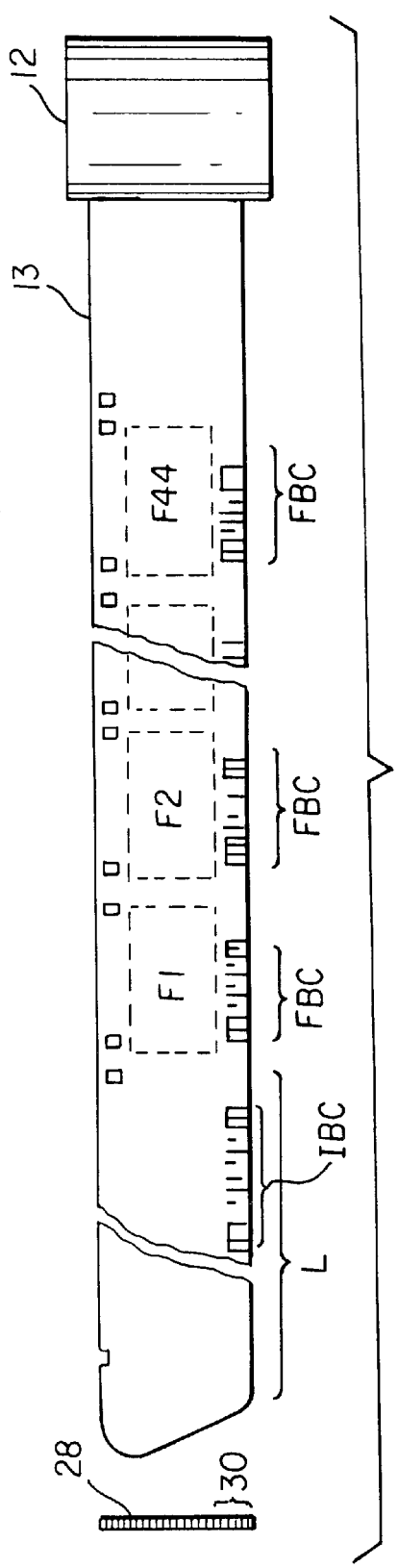
FIG. 4 plan view of APS film used in explaining the present invention.
Figure 5:
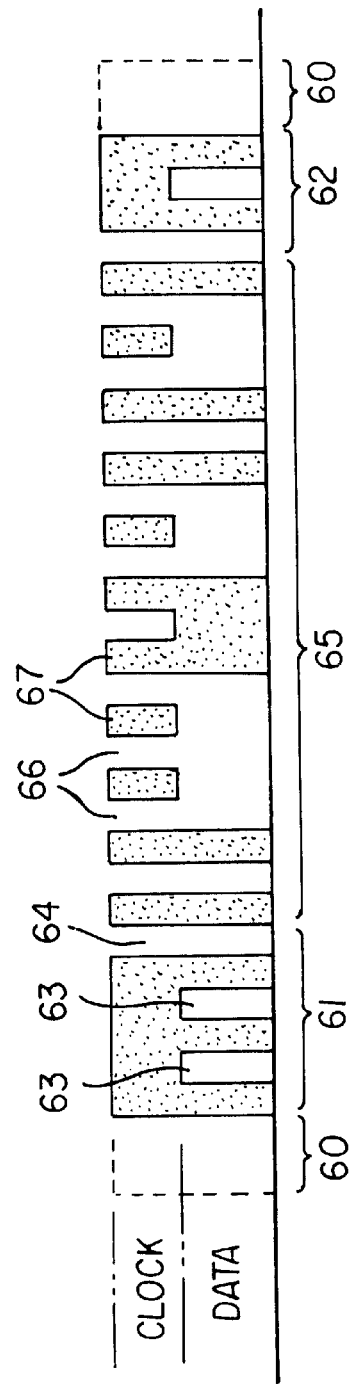
FIG. 5 illustrates a bar code typically found on the APS film of FIG. 4.

Referring to FIGS. 2 and 3, there are shown therein functional flow diagrams which are useful in describing the method of the invention. FIG. 2 shows the initial calibration which commences after the film 13 has been thrust from the film cartridge to the scan gate 23. At this point step 40 of the flow diagram obtains and sets an initial gain calibration profile in advance of commencing image scanning operation. This calibration profile establishes gain adjustment values effective, on a photosite by photosite basis, to output signals from the array of photosites in image sensor 28. It will be appreciated that, in a color image scanner, there are typically three image sensors, one for each of the red green and blue image spectral components of the scanned image frame and separate a calibration profile would be established for each red green and blue image sensor. For purposes of the present discussion however, the invention will be described in the context of a single image sensor. The gain calibration profile is typically obtained by scanning Dmin density in the leader portion L of the film 13 as shown in FIG. 4. After the initial gain calibration profile is established, step 42 determines photosite locations 30 in the image sensor 28 which correspond in location to the longitudinal region of the film in which are located the initial bar code IBC in the film leader L and the subsequent frame-specific bar codes FBC located adjacent each image frame F1–F40. The photosite locations are then saved as reference photosite locations for use later in the invention method. Methods for identifying the location of bar codes on film are believed to be well known. A particularly useful technique for this purpose is described in co-pending, commonly assigned U.S. patent application Ser. No. 09/137,566, filed Aug. 21, 1998 and entitled "Film Optical Image Bar Code Reader" - Wasula and Bryant, the disclosure of which is incorporated herein by reference. Once the initial bar code is located and the corresponding imager photosites identified, an initial Dmin density reading is obtained, with illumination ON, from a Dmin region associated with the initial bar code IBC. Referring to FIG. 5, a typical bar code on APS film is shown. In accordance with established standards associated with APS film, portions 60 on either end of the bar code in the longitudinal direction of the film are reserved areas which are always representative of Dmin of the film since no exposure of the film in these portions is permitted. Similarly, the entry pattern 61 and exit pattern 62 of the bar code have reserved areas 63, in the data track, and 64, which spans both the clock and data track, which are always at Dmin. In the data segment 65, the spaces between the dark clock elements 67 are always at Dmin. Any of the these reserved Dmin areas associated with bar code patterns on the film are useful for measurement of Dmin for purposes of the present invention because they represent assured areas of Dmin associated not only with the leader portion of the film but also along the length of the film adjacent each of the image frames F2 through F40. Although the Dmin and dark value readings from a single photosite in sensor 28 can be used to establish a reference Dmin value in advance of commencing image scanning, it is preferable to obtain an average Dmin value taken from a plurality of adjacent photosites and, in the illustrated example, ten photosites are used for this purpose. At step 46, with illumination OFF, output readings are taken from the same ten photosites to obtain an average dark value for the same region of the film as in step 44. At step 48, the difference between the average Dmin and dark values are determined to establish a reference Dmin value for the film in advance of commencing image scanning operation.

Referring now to FIG. 3, when image frame scan operation is commenced at start block 50, step 51 operates under command from the host computer 36 to advances the film to the desired image frame to be scanned. In step 52, the bar code associated with the frame to be scanned is located in the same manner as described above in connection with location of the initial bar code IBC. In step 53, outputs from the same reference photosites used to establish the reference Dmin value from the leader of the film are measured with illumination ON and with illumination OFF. The difference between these frame-specific readings is taken to establish a frame-specific Dmin value. In step 54. a revised gain calibration profile is established by multiplying each photosite value of the initial gain profile obtained from the leader portion of the film by the ratio of the reference Dmin value divided by the frame-specific Dmin value obtained in step 53. In step 55, the film is then moved to position the leading edge of the frame to be scanned in the scan gate 23 and the frame is then scanned with the image pixel output values from the image sensor 28 being adjusted by the frame-specific gain profile established in step 54. As a result of adjusting the gain profile used to calibrate image scan outputs, the adverse effects on scanning system response caused by changing operating conditions and ambient variations over long periods of time can be eliminated thereby providing for more accurate and consistent image scanning results.

As mentioned previously, it is desirable to use Dmin areas associated with the bar code regions on the film since these are reserved areas for which there is assurance with the film will be unexposed. However, it is within the scope of the invention to use other regions of the film associated with the leader portion and with frame-specific portions so long as the selected regions are known to accurately represent Dmin (unexposed) regions of the film.

The invention has been described in detail with particular reference to certain preferred embodiments thereof, but it will be understood that variations and modifications can be effected within the spirit and scope of the invention.

What is claimed is:

1. A method of scanning a film strip and establishing image frame-specific gain calibration settings for a film image scanner including a solid state image sensor including an array of photosites, the method comprising:

obtaining and setting, in advance of commencing image scanning operation, an initial gain calibration profile for gain adjustment, on a photosite-by-photosite basis, of output signals from said array of photosites;

obtaining, at substantially the same time as said initial gain calibration profile is set, a reference film Dmin value from at least one predetermined photosite aligned with a region of film pixels extending longitudinally of the film strip outside of image frame areas of the film;

subsequently advancing the film strip to one or more image frames to be scanned;

obtaining, for each frame to be scanned, a frame-specific Dmin value from said at least one photosite obtained from said region adjacent to each said image frame to be scanned; and setting a revised gain calibration profile for each image frame scan based on adjustment of said initial gain calibration profile in proportion to a difference between said reference Dmin value and said frame-specific Dmin value corresponding to the image frame to be scanned.

2. The method of claim 1, wherein said initial and revised gain calibration profiles and reference and frame-specific Dmin values are individually obtained and set for separate spectral components of the images.

3. The method of claim 1, in which said frame-specific Dmin values are obtained from a defined region adjacent the image frame containing a bar code associated with said image frame.

4. The method of claim 1, wherein said reference Dmin value is obtained by averaging outputs of a plurality of adjacent photosensor pixels.

5. The method of claim 4, wherein said frame-specific Dmin value for each frame scanned is obtained by averaging outputs of said plurality of adjacent photosensor pixels used for obtaining said reference Dmin value.

6. The method of claim 4, wherein said frame-specific Dmin value is obtained from adjacent film pixels within a defined region adjacent the image frame containing a bar code associated with said image frame.

7. The method of claim 1, wherein said reference Dmin value is obtained from a leader portion of the film strip.

8. The method of claim 1, wherein said reference Dmin value is obtained from a region of a leader portion of the film strip containing a bar code.

9. The method of claim 8, wherein said frame-specific Dmin value is obtained from adjacent film pixels within a defined region adjacent the image frame containing a bar code associated with said image frame.

10. The method of claim 6 or 9, wherein said reference or frame-specific Dmin value is obtained from predetermined specified Dmin areas within the bar code itself.

11. The method of claim 1, wherein said revised gain calibration profile is adjusted by multiplying said initial gain calibration profile by the ratio of said reference Dmin value to said frame-specific Dmin value.

* * * * *